US011927702B2

(12) United States Patent
Lin et al.

(10) Patent No.: US 11,927,702 B2
(45) Date of Patent: *Mar. 12, 2024

(54) LIDAR SENSOR SYSTEM INCLUDING A DUAL-POLARIZATION TRANSMIT AND RECEIVE OPTICAL ANTENNA

(71) Applicant: Aurora Operations, Inc., Pittsburgh, PA (US)

(72) Inventors: Sen Lin, Santa Clara, CA (US); Andrew Steil Michaels, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,170

(22) Filed: Jan. 19, 2023

(65) Prior Publication Data

US 2023/0417886 A1 Dec. 28, 2023

Related U.S. Application Data

(63) Continuation of application No. 17/848,167, filed on Jun. 23, 2022, now Pat. No. 11,592,540.

(51) Int. Cl.
*G01S 7/499* (2006.01)
*G01S 7/48* (2006.01)
(Continued)

(52) U.S. Cl.
CPC ............ *G01S 7/499* (2013.01); *G01S 7/4816* (2013.01); *G01S 7/4863* (2013.01); *G01S 17/931* (2020.01)

(58) Field of Classification Search
CPC ...... G01S 7/499; G01S 17/931; G01S 7/4816; G01S 7/4863
See application file for complete search history.

(56) References Cited

U.S. PATENT DOCUMENTS 10,008,772 B2 6/2018 Mayo
11,243,296 B2 2/2022 Byrd et al.
(Continued)

FOREIGN PATENT DOCUMENTS

WO 2019217860 A1 11/2019

OTHER PUBLICATIONS

International Search Report and Written Opinion for Application No. PCT/US2023/061306, dated May 22, 2023, 6 pages.
(Continued)

*Primary Examiner* — Jamil Ahmed
(74) *Attorney, Agent, or Firm* — Dority & Manning, P.A.

(57) ABSTRACT

A light detection and ranging (LIDAR) sensor system for a vehicle includes one or more LIDAR pixels. At least one of the one or more LIDAR pixels includes a dual-polarization optical antenna, a second optical antenna, and one or more receivers. The dual-polarization optical antenna is configured to emit a transmit beam having a first polarization orientation, and detect a return beam having a second polarization orientation. The second optical antenna is offset from the dual-polarization optical antenna by a particular distance, and is configured to detect the return beam having the second polarization orientation. The one or more receivers are configured to generate one or more signals in response to detecting the second polarization orientation of the return beam.

20 Claims, 7 Drawing Sheets

(51) Int. Cl.
G01S 7/481 (2006.01)
G01S 7/4863 (2020.01)
G01S 17/931 (2020.01)

(56) References Cited

U.S. PATENT DOCUMENTS

| | | |
|---|---|---|
| 2014/0077996 A1 | 3/2014 | Mayo |
| 2014/0376001 A1 | 12/2014 | Swanson |
| 2018/0172806 A1 | 6/2018 | Marron |
| 2018/0267250 A1 | 9/2018 | Hosseini et al. |
| 2018/0364336 A1 | 12/2018 | Hosseini et al. |
| 2020/0150241 A1 | 5/2020 | Byrnes et al. |
| 2021/0384624 A1* | 12/2021 | Abdalla ............... H01Q 3/267 |
| 2021/0389427 A1 | 12/2021 | Michaels et al. |
| 2021/0389470 A1 | 12/2021 | Michaels et al. |
| 2022/0003842 A1 | 1/2022 | Wang et al. |
| 2022/0050201 A1 | 2/2022 | Sun et al. |
| 2022/0196814 A1 | 6/2022 | Lin et al. |

OTHER PUBLICATIONS

Co-pending U.S. Appl. No. 17/842,699 inventors Sen Lin et al., filed Jun. 16, 2022.
Co-pending U.S. Appl. No. 17/845,948 inventors Sen Lin et al., filed Jun. 21, 2022.

\* cited by examiner

LIDAR SENSOR SYSTEM INCLUDING A DUAL-POLARIZATION TRANSMIT AND RECEIVE OPTICAL ANTENNA

CROSS-REFERENCE TO RELATED APPLICATIONS

This application is a continuation of U.S. Non-Provisional application Ser. No. 17/848,167 filed Jun. 23, 2022, which is hereby incorporated by reference in its entirety.

BACKGROUND INFORMATION

Frequency Modulated Continuous Wave (FMCW) light detection and ranging (LIDAR) directly measures range and velocity of an object by transmitting a frequency modulated light beam and detecting a return signal. The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

BRIEF SUMMARY OF THE INVENTION

Implementations of the disclosure include a light detection and ranging (LIDAR) sensor system including one or more LIDAR pixels. At least one of the one or more LIDAR pixels may include a dual-polarization optical antenna, a first receiver, and a second receiver. The dual-polarization optical antenna may be configured to (i) emit a transmit beam with a first polarization orientation and (ii) detect a return beam having a second polarization orientation. The first receiver may be configured to generate a first signal in response to receiving the second polarization orientation of the return beam and in response to a first local oscillator signal. The second receiver may be configured to generate a second signal in response to receiving the second polarization orientation of the return beam from the dual-polarization optical antenna and in response to a second local oscillator signal.

In an implementation, the dual-polarization optical antenna includes a two-dimensional (2D) polarization splitting grating coupler including a first port and a second port. The 2D polarization splitting grating can be configured to receive a transmit signal on the first port and can be configured to provide the return beam having the second polarization to the second port coupled to the second receiver.

In an implementation, the LIDAR sensor system further includes a single-polarization optical antenna configured to detect the return beam having the second polarization orientation. The single-polarization optical antenna can be coupled to the first receiver to provide the second polarization orientation of the return beam to the first receiver.

In an implementation, the single-polarization optical antenna is a one-dimensional (1D) polarization grating coupler.

In an implementation, the dual-polarization optical antenna is offset from the single-polarization optical antenna by a particular distance.

In an implementation, the first polarization orientation is orthogonal to the second polarization orientation.

In an implementation, the LIDAR sensor system further includes a single-polarization optical antenna configured to detect the return beam having the second polarization orientation.

In an implementation, the first local oscillator signal is polarized with a third polarization orientation, the second local oscillator signal is polarized with the third polarization orientation, and a transmit signal is polarized with the third polarization prior to transmission. The dual-polarization optical antenna may be configured to couple the transmit signal into free-space as the transmit beam.

In an implementation, the dual-polarization optical antenna is configured to couple the return beam into the at least one of the one or more LIDAR pixels as a return signal. The return signal may be polarized with the third polarization orientation.

In an implementation, the third polarization orientation is the first polarization orientation or the second polarization orientation.

In an implementation, the first receiver includes a first optical mixer and the second receiver includes a second optical mixer. The first receiver may include a first diode pair coupled to the first optical mixer and may be configured to provide a first electrical signal. The first electrical signal can be the first signal. The second receiver can include a second diode pair coupled to the second optical mixer and can be configured to provide a second electrical signal. The second electrical signal can be the second signal.

In an implementation, the transmit beam and the return beam are a narrow-band near-infrared wavelength.

In an implementation, the return beam is the transmit beam reflected off of an object.

Implementations of the disclosure include an autonomous vehicle control system for an autonomous vehicle. The autonomous vehicle control system may include a light detection and ranging (LIDAR) device and one or more processors. The LIDAR device may include one or more LIDAR pixels. At least one of the one or more LIDAR pixels may include a dual-polarization optical antenna, a first receiver, and a second receiver. The dual-polarization optical antenna may be configured to (i) emit a transmit beam with a first polarization orientation and (ii) detect a return beam having a second polarization orientation. The first receiver may be configured to generate a first electrical signal in response to receiving the second polarization orientation of the return beam and in response to a first local oscillator signal. The second receiver may be configured to generate a second electrical signal in response to receiving the second polarization orientation of the return beam from the dual-polarization optical antenna and in response to a second local oscillator signal. The one or more processors may be configured to control the autonomous vehicle in response to the first electrical signal and the second electrical signal.

In an implementation, the dual-polarization optical antenna includes a two-dimensional (2D) polarization splitting grating coupler having a first port and a second port. The 2D polarization splitting grating may be configured to receive a transmit signal on the first port and is configured to provide the return beam having the second polarization to the second port coupled to the second receiver.

In an implementation, the at least one of the one or more LIDAR pixels further includes a single-polarization optical antenna configured to detect the return beam having the second polarization orientation. The single-polarization optical antenna can be coupled to the first receiver to provide the second polarization orientation of the return beam to the first receiver.

In an implementation, the single-polarization optical antenna is a one-dimensional (1D) polarization grating coupler.

In an implementation, the dual-polarization optical antenna is offset from the single-polarization optical antenna by a particular distance.

In an implementation, the autonomous vehicle control system further includes a rotating mirror and a birefringent slab. The rotating mirror may be configured to direct the transmit beam into a LIDAR environment and configured to direct the return beam onto the at least one of the one or more LIDAR pixels. The birefringent slab may be positioned between the rotating mirror and the at least one of the one or more LIDAR pixels. The birefringent slab may be configured to direct the return beam having the second polarization orientation onto the single-polarization optical antenna or onto the dual-polarization optical antenna.

Implementations of the disclosure include an autonomous vehicle comprising. The autonomous vehicle may include a light detection and ranging (LIDAR) device and one or more processors. The LIDAR device may include one or more LIDAR pixels. At least one of the one or more LIDAR pixels may include a dual-polarization optical antenna, a first receiver, and a second receiver. The dual-polarization optical antenna may be configured to (i) emit a transmit beam with a first polarization orientation and (ii) detect a return beam having a second polarization orientation. The first receiver may be configured to generate a first electrical signal in response to receiving the second polarization orientation of the return beam and in response to a first local oscillator signal. The second receiver may be configured to generate a second electrical signal in response to receiving the second polarization orientation of the return beam from the dual-polarization optical antenna and in response to a second local oscillator signal. The one or more processors may be configured to control the autonomous vehicle in response to the first signal and the second signal.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Implementations of a LIDAR pixel with dual polarization transmit/receive optical antenna is described herein. A LIDAR pixel can include one or more modules, one or more integrated chips, or one or more electric circuits. In addition, a LIDAR pixel can be implemented as a single packaged chip or implemented as modular design such that a LIDAR pixel includes multiple packaged chips. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1600 nm.

Frequency Modulated Continuous Wave (FMCW) LIDAR directly measures range and velocity of an object/target by directing a frequency modulated light beam to an object or target. The light that is reflected from the object/target is combined with a tapped version of the light beam. The frequency of the resulting beat tone is proportional to the distance of the object from the LIDAR system once corrected for the doppler shift that requires a second measurement. The two measurements, which may or may not be performed at the same time, provide both range and velocity information.

Implementations of the disclosure include a LIDAR device including LIDAR pixels having an optical antenna, a receive optical antenna, a first receiver, and a second receiver. The optical antenna is a dual polarization optical antenna that emits a transmit beam at a first polarization orientation and that detects a return beam having a second polarization orientation. The receive optical antenna may be coupled to the first receiver to provide the return beam having the second polarization orientation. The dual-polarization optical antenna may be coupled to the second receiver to provide the return beam having the second polarization orientation. The first receiver generates a first signal in response to receiving the second polarization orientation of the return beam detected by the receive optical antenna, and the second receiver generates a second signal in response to receiving the second polarization orientation of the return beam detected by the dual-polarization optical antenna. Detecting the return beam at an offset from the transmit antenna may increase the signal to noise ratio (SNR) of the detected return beam and therefore increase the imaging quality of a LIDAR system. Additionally, detecting two different locations of the return beam may allow the LIDAR system to detect additional information about the external environment such as the objects positioned in a greater variety of ranges in the external environment of the LIDAR system. These and other implementations are described in more detail in connection with FIGS. 1-4D.

Figure 1:
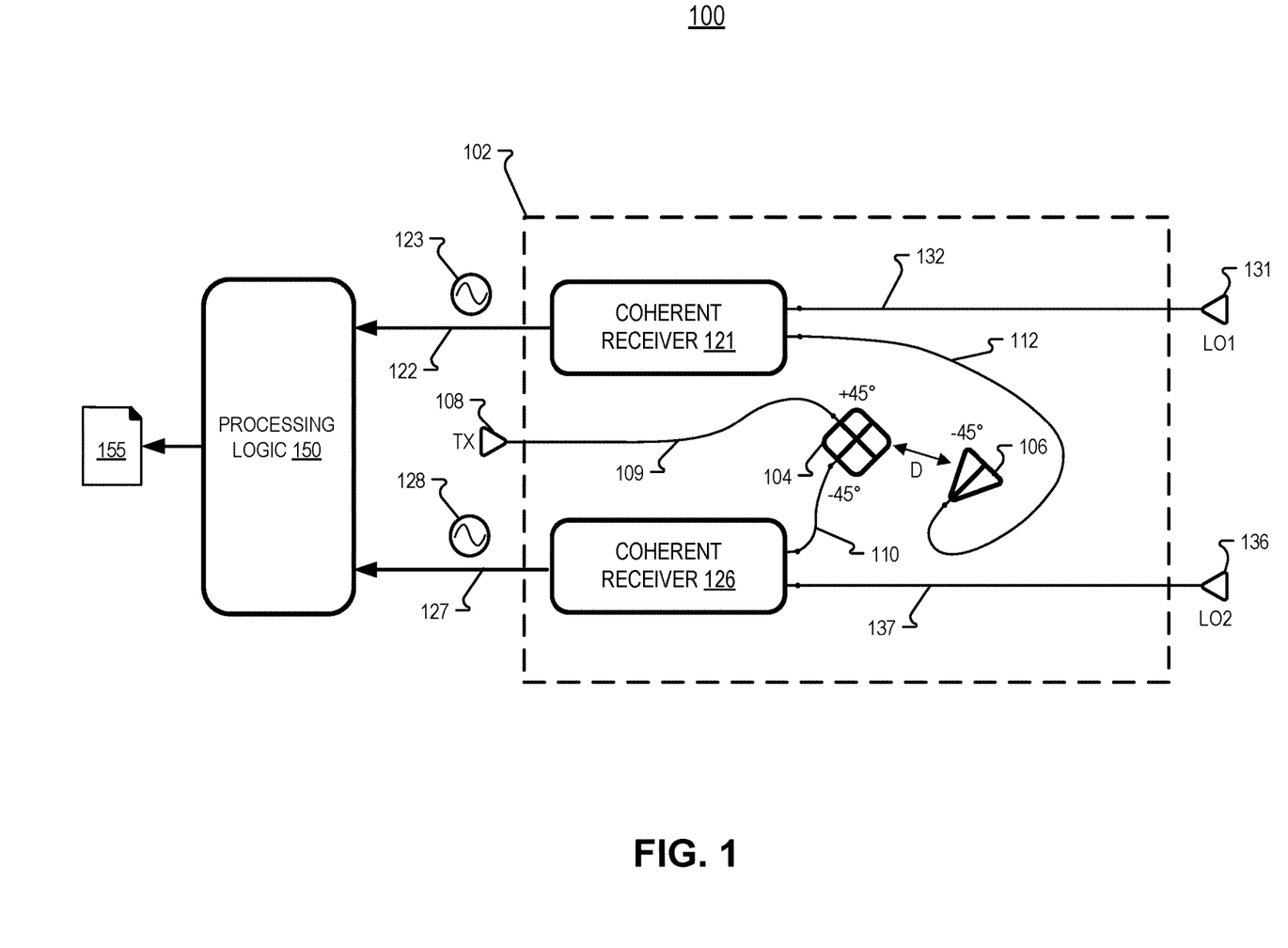
FIG. 1 illustrates a LIDAR system including a LIDAR pixel, in accordance with implementations of the disclosure.

FIG. 1 illustrates a LIDAR system 100 including a LIDAR pixel 102, in accordance with implementations of the disclosure. LIDAR pixel 102 includes an optical antenna 104, a receive optical antenna 106, a first coherent receiver 121, and a second coherent receiver 126, according to an implementation. However, the present invention is not limited to the particular LIDAR pixel architecture shown in FIG. 1. Any suitable chip design architecture can be used to implement a LIDAR pixel. For example, transmit and receive optical antennas can be implemented as a single module or a single integrated chip or implemented as separate modules or chips. As another example, first and second coherent receivers can be implemented as a single module or a single integrated chip or implemented as separate modules or chips. Optical antenna 104 may be configured to emit a transmit beam with a first polarization orientation and may be configured to detect a return beam having a second polarization orientation. Receive optical antenna 106 may be positioned a distance D from optical antenna 104 to account for or compensate for beam walk-off caused by a LIDAR system rotating mirror. The transmit beam may be an infrared transmit beam. The transmit beam may be a near-infrared transmit beam. The transmit beam may be emitted as a single defined polarization orientation. In FIG. 1, optical antenna 104 is illustrated as a dual-polarization optical coupler and may transmit the transmit beam in response to receiving a transmit signal 108 by way of a waveguide 109, according to an implementation. Transmit signal 108 may be generated by a laser and the transmit beam emitted by optical antenna 104 may have a very narrow linewidth (e.g., 1 nm or less).

In some implementations, optical antenna 104 may include a dual-polarization transmit/receive optical antenna that may be configured to emit a transmit signal with a first polarization orientation and that may be configured to (e.g., concurrently) detect a return beam having a second polarization orientation. The return beam may be a reflection of the transmit beam reflecting off of an object in an external environment of the LIDAR system 100. The first polarization orientation may be orthogonal to the second polarization orientation. In some implementations, the orthogonality can have a margin rage above 0 to 10%. For example, if the first polarization orientation has a degree with reference to the second polarization orientation between 80 and 100 degrees, it can be defined as orthogonal. Optical antenna 104 may be implemented as a two-dimensional (2D) polarization splitting grating coupler having two ports. A first port of optical antenna 104 may be coupled to transmit signal 108 with waveguide 109 to enable optical antenna 104 to emit a transmit beam with the first polarization orientation. A second port of optical antenna 104 may be coupled to second coherent receiver 126 with a waveguide 110 to enable optical antenna 104 to provide a second polarization orientation of the return signal to second coherent receiver 126. Optical antenna 104 may be configured to couple the return beam from free-space and into waveguide 110 as a return signal that propagates through waveguide 110 to coherent receiver 126. The return signal may have the same polarization orientation was transmit signal TX and as local oscillator signal LO2 while in LIDAR pixel 102 (e.g., while on-chip). The polarization orientation of the return signal(s), transmit signal TX, local oscillator signal LO1, and local oscillator signal LO2 may be the same as the first polarization orientation, or the second polarization orientation, or may be an entirely different polarization orientation, according to an implementation. The first polarization orientation may be positive 45 degrees, and the second polarization orientation may be negative 45 degrees (e.g., of linear TE or TM polarization), according to an implementation.

Receive optical antenna 106 may be implemented as a single-polarization grating coupler. Receive optical antenna 106 may be rotated to receive and detect (e.g., couple into a waveguide) the second polarization orientation of the return beam. Receive optical antenna 106 may be rotated to light that is polarized by negative 45 degrees. Receive optical antenna 106 may be offset from the location of optical antenna 104 by a distance D to enable receive optical antenna 106 to compensate for beam walk-off as, for example, illustrated in FIG. 3. Receive optical antenna 106 may be coupled to first coherent receiver 121 with a waveguide 112 to provide the second polarization orientation of the return beam to first coherent receiver 121.

In some implementations, first coherent receiver 121 may be configured to generate a first signal 123 in response to receiving the second polarization orientation of the return beam and a first local oscillator signal (LO1) 131. The first local oscillator signal 131 may be an optical signal having the second polarization orientation. In FIG. 1, the second polarization orientation of the return beam is received by first coherent receiver 121 from receive optical antenna 106 by way of waveguide 112, and the first local oscillator signal 131 is received by first coherent receiver 121 by way of waveguide 132, according to an implementation. First signal 123 may be an electrical signal provided to processing logic 150 by way of communication channel 122.

In some implementations, second coherent receiver 126 may be configured to generate a second signal 128 in response to receiving the second polarization orientation of the return beam and a second local oscillator signal (LO2) 136. The second local oscillator signal 136 may be an optical signal having the second polarization orientation. In FIG. 1, the second polarization orientation of the return beam is received by second coherent receiver 126 from optical antenna 104 by way of waveguide 110 and the second local oscillator signal 136 is received by second coherent receiver 126 by way of waveguide 137, according to an implementation. Second signal 128 may be an electrical signal provided to processing logic 150 by way of communication channel 127.

In some implementations, processing logic 150 may be configured to generate an image 155 in response to receiving first signal 123 and second signal 128 from first coherent receiver 121 and second coherent receiver 126, respectively. LIDAR system 100 may include an array of LIDAR pixels 102 that are configured to provide first signals (e.g., signal 123) and second signals (e.g., signal 128) to processing logic 150. In this context, processing logic 150 may generate image 155 in response to the first signals and second signals received by processing logic 150 by the plurality of LIDAR pixels 102 in the array of LIDAR pixels.

In an example of operation, transmit signal 108 may be emitted into free space as the transmit beam by optical antenna 104. The transmit beam may propagate through one or more lenses and be deflected by a rotating mirror, and then propagate through the external environment until encountering an object. A portion of the transmit beam that encounters the object may be reflected back toward LIDAR system 100 and LIDAR pixel 102 as the return beam. The return beam may reflect off the rotating mirror and propagate through the one or more lenses but be offset relative to optical antenna 104 due to the time difference in the rotation of the mirror. To compensate for this offset, receive optical antenna 106 may be offset by distance D from optical antenna 104.

Figure 2A:
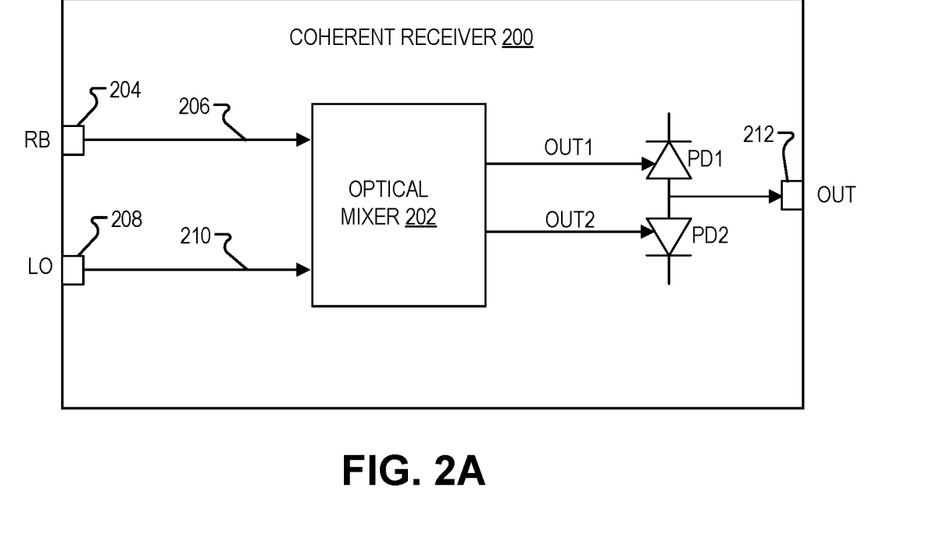
FIGS. 2A and 2B illustrate examples of coherent receivers, in accordance with implementations of the disclosure.
Figure 2B:
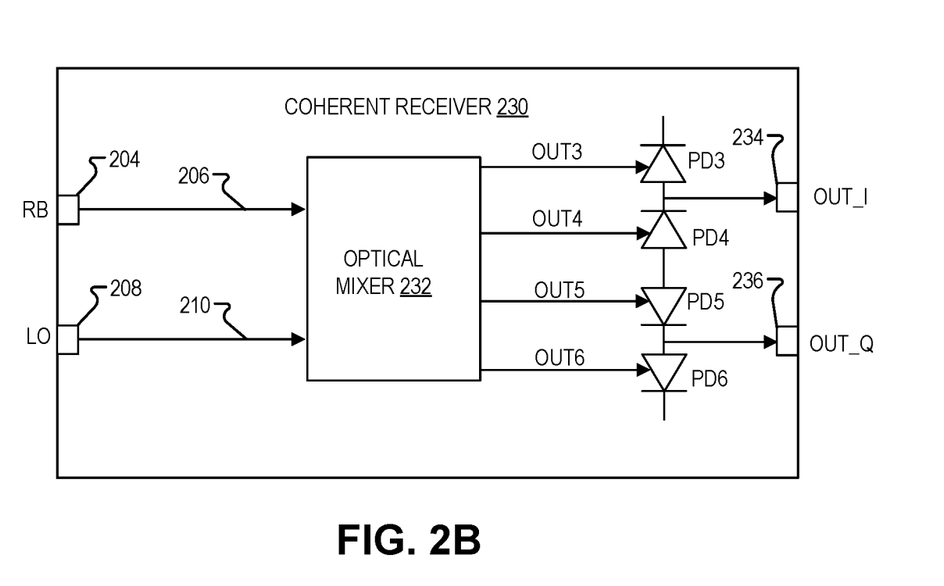

FIGS. 2A and 2B illustrate examples of coherent receivers 121 and 126 (shown in FIG. 1), according to implementations of the disclosure.

FIG. 2A illustrates a coherent receiver 200. Coherent receiver 200 may include an optical mixer 202, a return beam port 204, a local oscillator port 208 and an output port 212. Optical mixer 202 is configured to combine a return beam signal RB with a local oscillator signal LO to generate an output signal OUT, according to an implementation. Optical mixer 202 may be configured to receive two or more optical signals. Optical mixer 202 may be coupled to receive return beam signal RB from return beam port 204 through a waveguide 206. Optical mixer 202 may be coupled to receive local oscillator signal LO from local oscillator port 208 through a waveguide 210, according to an implementation. Optical mixer 202 may combine input signals to generate a number of combined output signals OUT1 and OUT2. The number of output signals from an optical mixer can be any suitable number, not limited to a particular number. Output signals OUT1 and OUT2 are provided to a photodiode pair (including photodiodes PD1 and PD2) to convert return beam signal RB and local oscillator signal LO into output signal OUT, according to an implementation. Output signal OUT may be an electrical signal. Output signal OUT may be a beat signal that represents a range and/or velocity of one or more objects in the environment of a LIDAR system. Each of these output signal OUT variations may provide object characteristics (e.g., distance, reflectivity) about the object in the environment from which the return beam was reflected. Object characteristics (e.g., distance, reflectivity) may enable autonomous vehicles (e.g., trucks) to perform vehicle operations (e.g., stop, swerve, ignore) based on the characteristics of the object(s), for example. Each output signal may be provided to respective ones of a number of receivers to enable concurrent reception and processing of a number of output signals.

FIG. 2B illustrates an example of a coherent receiver 230 having an optical mixer 232 that is configured to provide multiple output signals OUT3, OUT4, OUT5, and OUT6, based on return beam signal RB and local oscillator signal LO, according to an implementation. However, the number of output signals from an optical mixer can be any suitable number, not limited to a particular number. Optical mixer 232 provides signals OUT3, OUT4, OUT5, and OUT6 to a photodiode configuration that converts the mixed signals into an in-phase output signal OUT_I and a quadrature output signal OUT_Q, according to an implementation. In-phase output signal OUT_I may be provided to output port 234, and quadrature output signal OUT_Q may be provided to output port 236. The photodiode configuration may include photodiodes PD3, PD4, PD5, and PD6.

Figure 3:
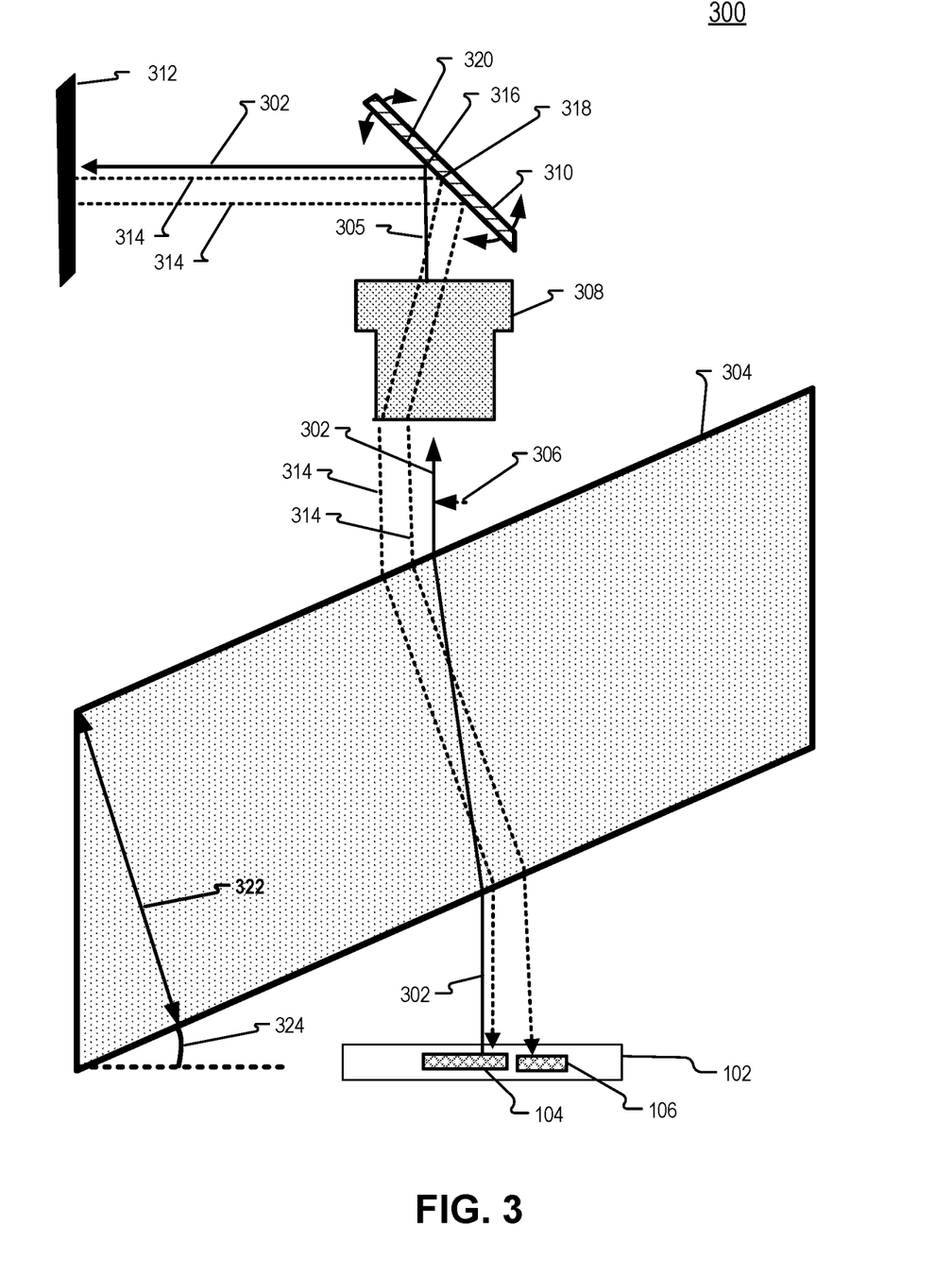
FIG. 3 illustrates a LIDAR system including a LIDAR pixel, a birefringent slab, and a rotating mirror, in accordance with implementations of the disclosure.

FIG. 3 illustrates an example of a LIDAR system 300 that shows how LIDAR pixel 102 can be used to compensate for beam walk-off and support beam scanning, in accordance with implementations of the disclosure.

In an example of operation, optical antenna 104 may emit light as a transmit beam 302 having a first polarization orientation (e.g., linearly polarized at 45 degrees). Transmit beam 302 may propagate through a birefringent slab 304, which introduces a small offset 306 in the position of transmit beam 302 relative to optical antenna 104. Transmit beam 302 may be collimated by a lens 308 and directed to a mirror 310. Lens 308 may be disposed between birefringent slab 304 and mirror 310. Mirror 310 may be selectively rotated or may be configured to continuously rotate to scan the LIDAR environment. Transmit beam 302 can be reflected off of mirror 310 and directed into the LIDAR environment as a free space light beam. Transmit beam 302 can propagate to an object 312 and may be reflected back as a return beam 314. Object 312 may be a reflective surface, a diffuse surface, or a partially reflective and partially diffuse surface. Object 312 may change the polarization orientation/characteristics of return beam 314 to a polarization orientation that is different than transmit beam 302. For example, the polarization of return beam 314 may be randomized. Return beam 314 may include components of several polarization orientations (e.g., circular, elliptical, linear). Return beam 314 may include a light component that has a second polarization orientation (e.g., linearly polarized by −45°) that is, for example, orthogonal to the first polarization orientation (e.g., linearly polarized by +45°) of transmit beam 302, as an example. Upon reflection, return beam 314 propagates back to mirror 310.

During the transit time of transmit beam 302 and return beam 314 to object 312 and back to mirror 310, mirror 310 may have rotated by a small amount. The amount of rotation will vary based on the distance traveled by transmit beam 302 and return beam 314. Because of the rotation of mirror 310, return beam 314 may be incident on lens 308 at a different angle than transmit beam 302. The changing locations of return beam 314 on mirror 310 could cause return beam 314 to walk-off or miss optical antenna 104. However, LIDAR pixel 102 includes receive optical antenna 106, so LIDAR pixel 102 may receive return beam 314 of the second polarization orientation if return beam 314 returns at an offset away from optical antenna 104 and becomes incident upon receive optical antenna 106.

Upon return to LIDAR pixel 102, birefringent slab 304 may direct return beam 314 towards different locations of LIDAR pixel 102 based on the polarization characteristics of return beam 314, according to an implementation. Return beam 314 may be directed to pass through the birefringent slab 304, which shifts return beam 314 in space horizontally. If the polarization of return beam 314 is different than the polarization of transmit beam 302, the shift introduced by the birefringent material may be different. Birefringent slab 304 may be configured to direct return beam 314 to locations on LIDAR pixel 102 based on the polarization orientation or characteristics of return beam 314, according to an implementation. Birefringent slab 304 may be configured to direct return beam 314 along a different optical path than transmit beam 302, based on the polarization of the two signals, to reduce signal interference, according to an implementation.

In some implementations, by selecting a particular birefringent material and controlling a thickness 322 of birefringent slab 304 and an angle 324 of birefringent slab 304, the relative shifts of the transmitted and returned beams can be controlled. In the illustration of FIG. 3, the birefringent material is angled with respect to transmit beam 302 incident on birefringent slab 304 and birefringent slab 304 is tilted with respect to return beam 314 incident on the birefringent material. In an implementation, tilt angle 324 of birefringent slab 304 and thickness 322 of birefringent slab 304 are configured for detection of objects at a detection distance of 50 meters or greater.

In some implementations, birefringent slab 304 may include $LiNO_3$ (Lithium Nitrate). In some implementations, birefringent slab 304 may include $YVO_4$ (Yttrium Orthovanadate). However, materials for a birefringent slap are not limited to the materials described above. Any suitable material can be used for a birefringent slab in order to optimally correct for the walk-off introduced by rotating mirrors for a wide range of object distances. For example, optimizing for a longer range target may include selecting a birefringent material having a larger horizontal shift due to the longer round trip time for the beam to reflect off the target and propagate back to receive optical antennas 104, 106.

The tilted piece of birefringent slab 304 may be a part of the lens assembly or a chip package assembly. It may be integrated on the same photonic chip as an array of the coherent pixels. A plurality of coherent pixels and tilted birefringent pieces can be used together to realize more complex operations of an FMCW LIDAR. The birefringent piece may be motorized to change tilt angle 324, in some implementations. In some implementations, of LIDAR system 300, birefringent slab 304 is omitted between LIDAR pixel 102 and lens 308. In some implementations, one or more optical elements are positioned between mirror 310 and LIDAR pixel 102 to manipulate the polarization characteristics of transmit beam 302 and return beam 314. For example, one or more half-wave plates or quarter-wave plates may be included to change polarizations from linear to circular (or vice-versa) and to shift orientations by orthogonal amounts.

1. System Environment for Autonomous Vehicles

Figure 4A:
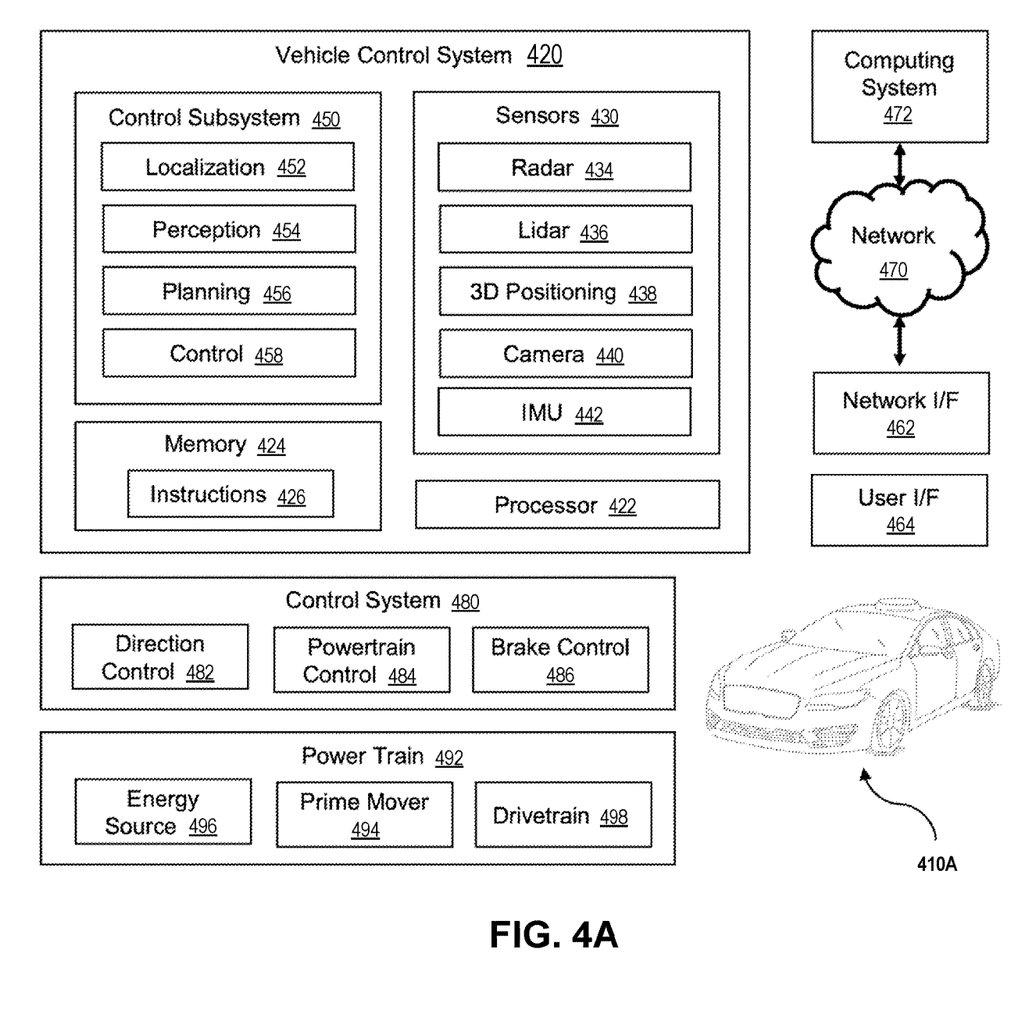
FIG. 4A illustrates a block diagram illustrating an example of a system environment for autonomous vehicles, in accordance with implementations of the disclosure.

FIG. 4A is a block diagram illustrating an example of a system environment for autonomous vehicles according to some implementations.

Referring to FIG. 4A, an example autonomous vehicle 410A within which the various techniques disclosed herein may be implemented. The vehicle 410A, for example, may include a powertrain 492 including a prime mover 494 powered by an energy source 496 and capable of providing power to a drivetrain 498, as well as a control system 480 including a direction control 482, a powertrain control 484, and a brake control 486. The vehicle 410A may be implemented as any number of different types of vehicles, including vehicles capable of transporting people and/or cargo, and capable of traveling in various environments, and it will be appreciated that the aforementioned components 480-498 can vary widely based upon the type of vehicle within which these components are utilized.

For simplicity, the implementations discussed hereinafter will focus on a wheeled land vehicle such as a car, van, truck, bus, etc. In such implementations, the prime mover 494 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 498 can include wheels and/or tires along with a transmission and/or any other mechanical drive components to convert the output of the prime mover 494 into vehicular motion, as well as one or more brakes configured to controllably stop or slow the vehicle 410A and direction or steering components suitable for controlling the trajectory of the vehicle 410A (e.g., a rack and pinion steering linkage enabling one or more wheels of the vehicle 410A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 482 may include one or more actuators and/or sensors for controlling and receiving feedback from the direction or steering components to enable the vehicle 410A to follow a desired trajectory. The powertrain control 484 may be configured to control the output of the powertrain 492, e.g., to control the output power of the prime mover 494, to control a gear of a transmission in the drivetrain 498, etc., thereby controlling a speed and/or direction of the vehicle 410A. The brake control 486 may be configured to control one or more brakes that slow or stop vehicle 410A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 410A can be implemented in a vehicle control system 420, which may include one or more processors 422 and one or more memories 424, with each processor 422 configured to execute program code instructions 426 stored in a memory 424. The processors(s) can include, for example, graphics processing unit(s) ("GPU(s)") and/or central processing unit(s) ("CPU(s)").

Sensors 430 may include various sensors suitable for collecting information from a vehicle's surrounding environment for use in controlling the operation of the vehicle. For example, sensors 430 can include radar sensor 434, LIDAR (Light Detection and Ranging) sensor 436, a 3D positioning sensors 438, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 438 can be used to determine the location of the vehicle on the Earth using satellite signals. The sensors 430 can include a camera 440 and/or an IMU (inertial measurement unit) 442. The camera 440 can be a monographic or stereographic camera and can record still and/or video images. The IMU 442 can include multiple gyroscopes and accelerometers capable of detecting linear and rotational motion of the vehicle in three directions. One or more encoders (not illustrated), such as wheel encoders may be used to monitor the rotation of one or more wheels of vehicle 410A. Each sensor 430 can output sensor data at various data rates, which may be different than the data rates of other sensors 430.

The outputs of sensors 430 may be provided to a set of control subsystems 450, including, a localization subsystem 452, a planning subsystem 456, a perception subsystem 454, and a control subsystem 458. The localization subsystem 452 can perform functions such as precisely determining the location and orientation (also sometimes referred to as "pose") of the vehicle 410A within its surrounding environment, and generally within some frame of reference. The location of an autonomous vehicle can be compared with the location of an additional vehicle in the same environment as part of generating labeled autonomous vehicle data. The perception subsystem 454 can perform functions such as detecting, tracking, determining, and/or identifying objects within the environment surrounding vehicle 410A. A machine learning model can be utilized in tracking objects. The planning subsystem 456 can perform functions such as planning a trajectory for vehicle 410A over some timeframe given a desired destination as well as the static and moving objects within the environment. A machine learning can be utilized in planning a vehicle trajectory. The control subsystem 458 can perform functions such as generating suitable control signals for controlling the various controls in the vehicle control system 420 in order to implement the planned trajectory of the vehicle 410A. A machine learning model can be utilized to generate one or more signals to control an autonomous vehicle to implement the planned trajectory.

It will be appreciated that the collection of components illustrated in FIG. 4A for the vehicle control system 420 is merely exemplary in nature. Individual sensors may be omitted in some implementations. Additionally or alternatively, in some implementations, multiple sensors of types illustrated in FIG. 4A may be used for redundancy and/or to cover different regions around a vehicle, and other types of sensors may be used. Likewise, different types and/or combinations of control subsystems may be used in other implementations. Further, while subsystems 452-458 are illustrated as being separate from processor 422 and memory 424, it will be appreciated that in some implementations, some or all of the functionality of a subsystem 452-458 may be implemented with program code instructions 426 resident in one or more memories 424 and executed by one or more processors 422, and that these subsystems 452-458 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 420 may be networked in various manners.

In some implementations, the vehicle 410A may also include a secondary vehicle control system (not illustrated), which may be used as a redundant or backup control system for the vehicle 410A. The secondary vehicle control system may be capable of fully operating the autonomous vehicle 410A in the event of an adverse event in the vehicle control system 420, while in other implementations, the secondary vehicle control system may only have limited functionality, e.g., to perform a controlled stop of the vehicle 410A in response to an adverse event detected in the primary vehicle control system 420. In still other implementations, the secondary vehicle control system may be omitted.

In general, an innumerable number of different architectures, including various combinations of software, hardware, circuit logic, sensors, networks, etc. may be used to implement the various components illustrated in FIG. 4A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 410A, e.g., any cache memory in a processor, as well as any storage capacity used as a virtual memory, e.g., as stored on a mass storage device or another computer controller. One or more processors illustrated in FIG. 4A, or entirely separate processors, may be used to implement additional functionality in the vehicle 410A outside of the purposes of autonomous control, e.g., to control entertainment systems, to operate doors, lights, convenience features, etc.

In addition, for additional storage, the vehicle 410A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 410A may include a user interface 464 to enable vehicle 410A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 410A may include one or more network interfaces, e.g., network interface 462, suitable for communicating with one or more networks 470 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 410A receives environmental and other data for use in autonomous control thereof. Data collected by the one or more sensors 430 can be uploaded to a computing system 472 via the network 470 for additional processing. A time stamp can be added to each instance of vehicle data prior to uploading.

Each processor illustrated in FIG. 4A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 410A via network 470, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 4A is not intended to limit implementations disclosed herein. Indeed, other alternative hardware and/or software environments may be used without departing from the scope of implementations disclosed herein.

2. FM LIDAR for Automotive Applications

A truck can include a LIDAR system (e.g., vehicle control system 420 and/or LIDAR system 100 and/or 300, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. An FM LIDAR system may use a continuous wave (referred to as, "FMCW LIDAR" or "coherent FMCW LIDAR") or a quasi-continuous wave (referred to as, "FMQW LIDAR"). The LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 430 in FIG. 4A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 430 in FIG. 4A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 430 in FIG. 4A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sun-light. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

3. Commercial Trucking

Figure 4B:
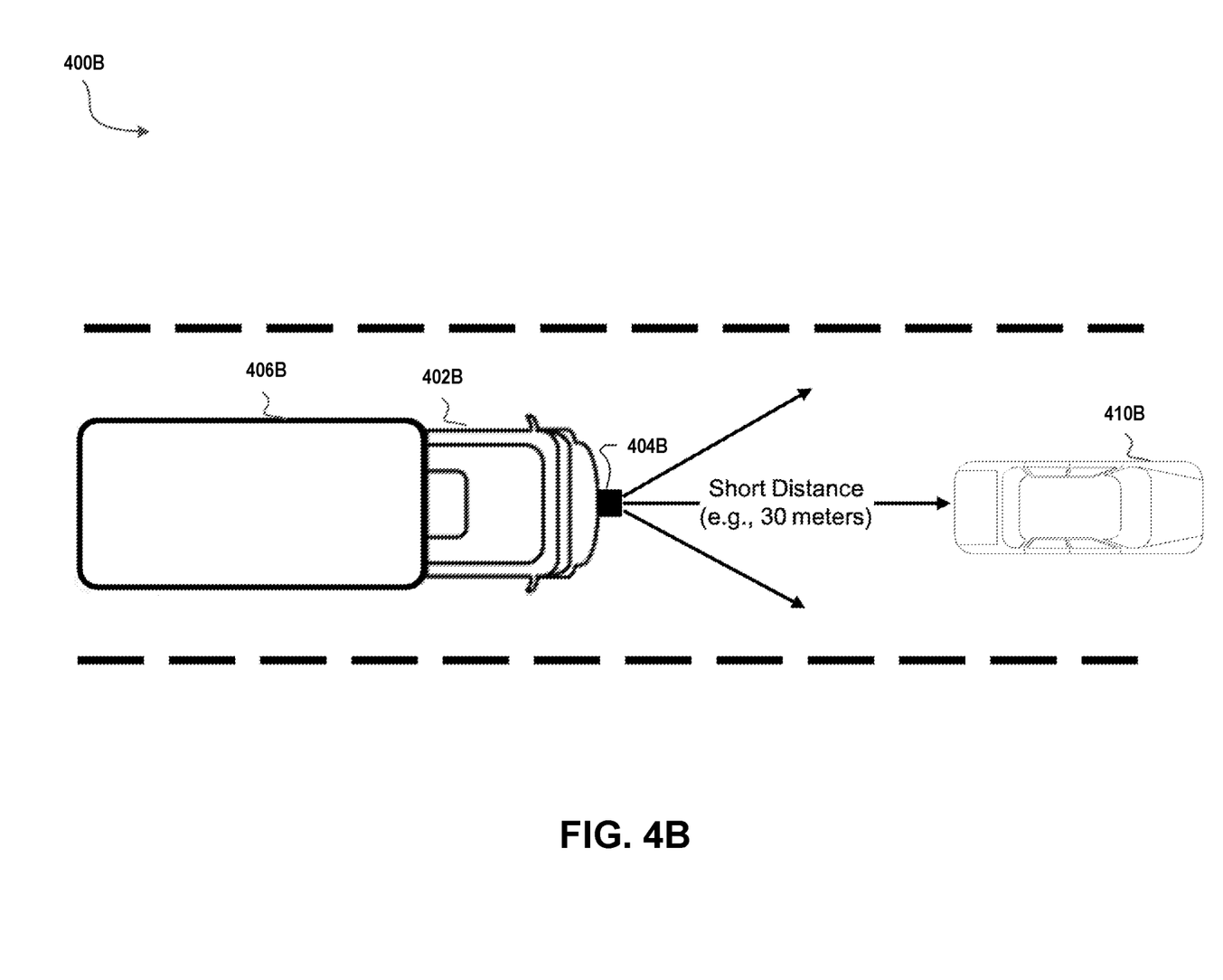
FIG. 4B illustrates a block diagram illustrating an example of a system environment for autonomous commercial trucking vehicles, in accordance with implementations of the disclosure.

FIG. 4B is a block diagram illustrating an example of a system environment for autonomous commercial trucking vehicles, according to some implementations. The environment 400B includes a commercial truck 402B for hauling cargo 406B. In some implementations, the commercial truck 402B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 402B may be a flatbed truck, a refrigerated truck (e.g., a reefer truck), a vented van (e.g., dry van), a moving truck, etc. The cargo 406B may be goods and/or produce. The commercial truck 402B may include a trailer to carry the cargo 406B, such as a flatbed trailer, a lowboy trailer, a step deck trailer, an extendable flatbed trailer, a sidekit trailer, etc.

The environment 400B includes an object 410B (shown in FIG. 4B as another vehicle) that is within a distance range that is equal to or less than 30 meters from the truck.

The commercial truck 402B may include a LIDAR system 404B (e.g., an FM LIDAR system, vehicle control system 420 in FIG. 4A, LIDAR system 100 in FIG. 1, LIDAR system 300 in FIG. 3, etc.) for determining a distance to the object 410B and/or measuring the velocity of the object 410B. Although FIG. 4B shows that one LIDAR system 404B is mounted on the front of the commercial truck 402B, the number of LIDAR system and the mounting area of the LIDAR system on the commercial truck are not limited to a particular number or a particular area. The commercial truck 402B may include any number of LIDAR systems 404B (or components thereof, such as sensors, modulators, coherent signal generators, etc.) that are mounted onto any area (e.g., front, back, side, top, bottom, underneath, and/or bottom) of the commercial truck 402B to facilitate the detection of an object in any free-space relative to the commercial truck 402B.

As shown, the LIDAR system 404B in environment 400B may be configured to detect an object (e.g., another vehicle, a bicycle, a tree, street signs, potholes, etc.) at short distances (e.g., 30 meters or less) from the commercial truck 402B.

Figure 4C:
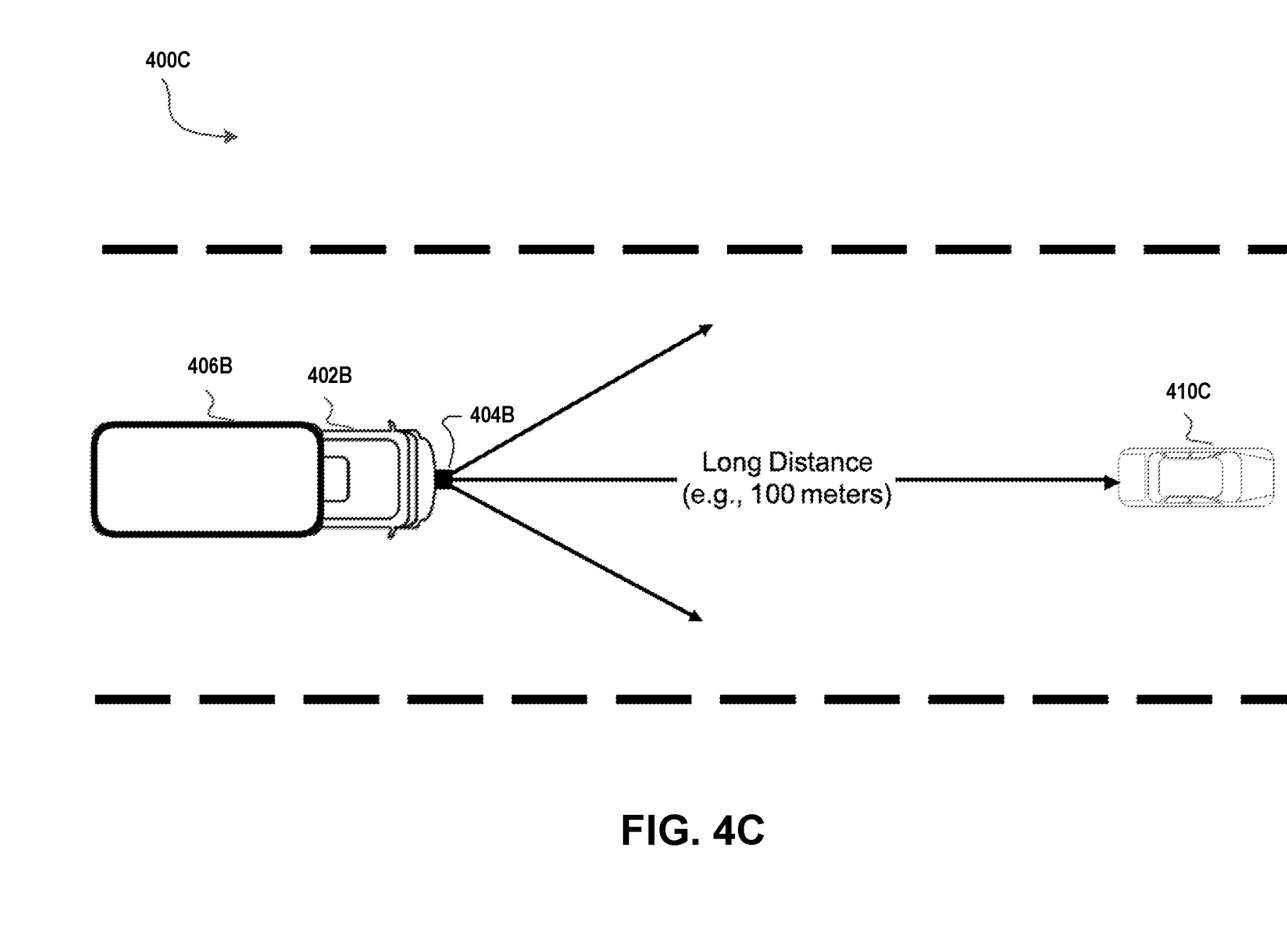
FIG. 4C illustrates a block diagram illustrating an example of a system environment for autonomous commercial trucking vehicles, in accordance with implementations of the disclosure.

FIG. 4C is a block diagram illustrating an example of a system environment for autonomous commercial trucking vehicles, according to some implementations. The environment 400C includes the same components (e.g., commercial truck 402B, cargo 406B, LIDAR system 404B, etc.) that are included in environment 400B.

Figure 4D:
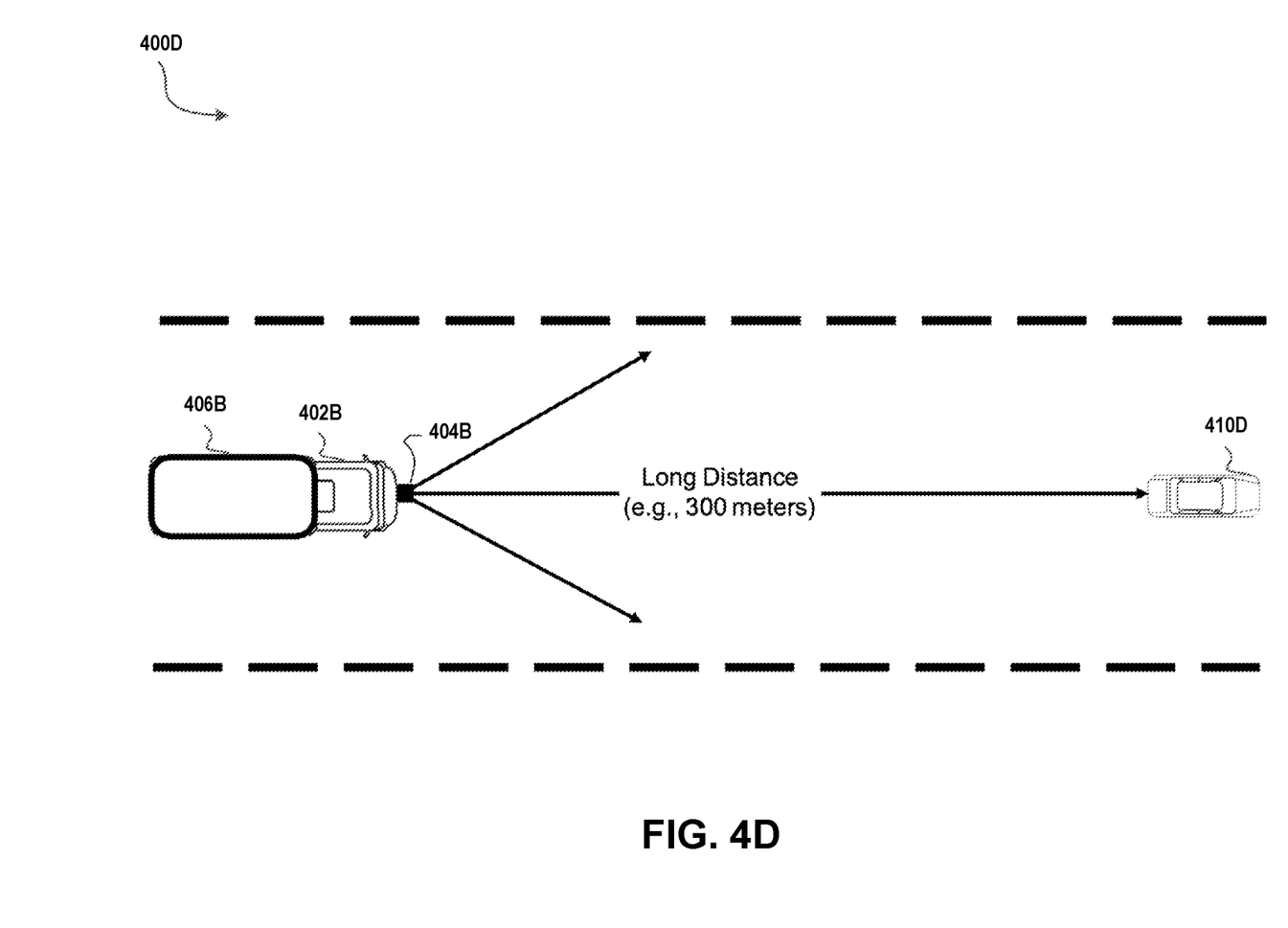
FIG. 4D illustrates a block diagram illustrating an example of a system environment for autonomous commercial trucking vehicles, in accordance with implementations of the disclosure.

The environment 400C includes an object 410C (shown in FIG. 4C as another vehicle) that is within a distance range that is (i) more than 30 meters and (ii) equal to or less than 150 meters from the commercial truck 402B. As shown, the LIDAR system 404B in environment 400C may be configured to detect an object (e.g., another vehicle, a bicycle, a tree, street signs, potholes, etc.) at a distance (e.g., 100 meters) from the commercial truck 402B FIG. 4D is a block diagram illustrating an example of a system environment for autonomous commercial trucking vehicles, according to some implementations. The environment 400D includes the same components (e.g., commercial truck 402B, cargo 406B, LIDAR system 404B, etc.) that are included in environment 400B.

The environment 400D includes an object 410D (shown in FIG. 4D as another vehicle) that is within a distance range that is more than 150 meters from the commercial truck 402B. As shown, the LIDAR system 404B in environment 400D may be configured to detect an object (e.g., another vehicle, a bicycle, a tree, street signs, potholes, etc.) at a distance (e.g., 300 meters) from the commercial truck 402B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

4. Continuous Wave Modulation and Quasi-Continuous Wave Modulation

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A light detection and ranging (LIDAR) sensor system for a vehicle, the LIDAR sensor system comprising:
   one or more LIDAR pixels, wherein at least one of the one or more LIDAR pixels includes:
   a dual-polarization optical antenna configured to: (i) emit a transmit beam having a first polarization orientation, and (ii) detect a return beam having a second polarization orientation;
   a second optical antenna offset from the dual-polarization optical antenna by a particular distance, wherein the second optical antenna is configured to detect the return beam having the second polarization orientation; and
   one or more receivers configured to generate one or more signals in response to detecting the second polarization orientation of the return beam.

2. The LIDAR sensor system of claim 1, wherein the dual-polarization optical antenna includes a two-dimensional (2D) polarization splitting grating coupler having a first port and a second port, wherein the 2D polarization splitting grating coupler is configured to receive a transmit signal on the first port and is configured to provide the return beam having the second polarization orientation to the second port coupled to at least one receiver of the one or more receivers.

3. The LIDAR sensor system of claim 1, wherein the second optical antenna comprises a single-polarization optical antenna coupled to the one or more receivers to provide the second polarization orientation of the return beam to the one or more receivers.

4. The LIDAR sensor system of claim 3, wherein the single-polarization optical antenna includes a one-dimensional (1D) polarization grating coupler.

5. The LIDAR sensor system of claim 1, wherein the first polarization orientation is orthogonal to the second polarization orientation.

6. The LIDAR sensor system of claim 1, wherein the one or more receivers comprise:
   a first receiver configured to generate a first electrical signal in response to the dual-polarization optical antenna and in response to a first local oscillator signal; and
   a second receiver configured to generate a second electrical signal in response to the second optical antenna and in response to a second local oscillator signal.

7. The LIDAR sensor system of claim 6, wherein the first local oscillator signal is polarized with a third polarization orientation and the second local oscillator signal is polarized with the third polarization orientation.

8. The LIDAR sensor system of claim 7, wherein the dual-polarization optical antenna is configured to couple the return beam into the at least one of the one or more LIDAR pixels as a return signal, wherein the return signal is polarized with the third polarization orientation.

9. The LIDAR sensor system of claim 8, wherein the third polarization orientation is the first polarization orientation or the second polarization orientation.

10. The LIDAR sensor system of claim 6, wherein the first receiver includes a first optical mixer and the second receiver includes a second optical mixer, wherein the first receiver includes a first diode pair coupled to the first optical mixer and configured to provide the first electrical signal, wherein the second receiver includes a second diode pair coupled to the second optical mixer and configured to provide the second electrical signal.

11. The LIDAR sensor system of claim 1, wherein the transmit beam and the return beam have a narrow-band near-infrared wavelength.

12. The LIDAR sensor system of claim 1, wherein the particular distance is configured to compensate for a beam walk-off of the return beam.

13. An autonomous vehicle control system for an autonomous vehicle, the autonomous vehicle control system comprising:
   a light detection and ranging (LIDAR) device including one or more LIDAR pixels, wherein at least one of the one or more LIDAR pixels includes:
      a dual-polarization optical antenna configured to: (i) emit a transmit beam with a first polarization orientation, and (ii) detect a return beam having a second polarization orientation;
      a second optical antenna offset from the dual-polarization optical antenna by a particular distance, wherein the second optical antenna is configured to detect the return beam having the second polarization orientation; and
      one or more receivers configured to generate one or more signals in response to detecting the second polarization orientation of the return beam; and
   one or more processors configured to control the autonomous vehicle in response to the one or more signals.

14. The autonomous vehicle control system of claim 13, wherein the dual-polarization optical antenna includes a two-dimensional (2D) polarization splitting grating coupler having a first port and a second port, wherein the 2D polarization splitting grating coupler is configured to receive a transmit signal on the first port and is configured to provide the return beam having the second polarization orientation to the second port coupled to at least one receiver of the one or more receivers.

15. The autonomous vehicle control system of claim 13, wherein the second optical antenna comprises a single-polarization optical antenna that includes a one-dimensional (1D) polarization grating coupler.

16. The autonomous vehicle control system of claim 13, wherein the particular distance is configured to compensate for a beam walk-off of the return beam.

17. The autonomous vehicle control system of claim 13 further comprising:
   a rotating mirror configured to direct the transmit beam into a LIDAR environment and configured to direct the return beam onto the at least one of the one or more LIDAR pixels; and
   a birefringent slab positioned between the rotating mirror and the at least one of the one or more LIDAR pixels, wherein the birefringent slab is configured to direct the return beam having the second polarization orientation onto the dual-polarization optical antenna or the second optical antenna based on a time difference in a rotation of the rotating mirror.

18. An autonomous vehicle comprising:
   a light detection and ranging (LIDAR) device including one or more LIDAR pixels, wherein at least one of the one or more LIDAR pixels includes:
      a dual-polarization optical antenna configured to: (i) emit a transmit beam with a first polarization orientation, and (ii) detect a return beam having a second polarization orientation;
      a second optical antenna offset from the dual-polarization optical antenna by a particular distance, wherein the second optical antenna is configured to detect the return beam having the second polarization orientation; and
      one or more receivers configured to generate one or more signals in response to detecting the second polarization orientation of the return beam; and
   one or more processors configured to control the autonomous vehicle in response to the one or more signals.

19. The autonomous vehicle of claim 18, wherein the second optical antenna comprises a single-polarization optical antenna that includes a one-dimensional (1D) polarization grating coupler.

20. The autonomous vehicle of claim 18, wherein the particular distance is configured to compensate for a beam walk-off of the return beam.

* * * * *